United States Patent [19]

Sakabe

[11] 4,226,735

[45] Oct. 7, 1980

[54] DIELECTRIC CERAMIC COMPOSITION AND PROCESS FOR ITS PRODUCTION CONTAINING MgTiO$_3$ AND Pb$_3$O$_4$ HAVING A QUANTITATIVE RELATIONSHIP

[75] Inventor: Yukio Sakabe, Nagaokakyo, Japan

[73] Assignee: Murata Manufacturing Co., Ltd., Kyoto, Japan

[21] Appl. No.: 961,043

[22] Filed: Nov. 15, 1978

[30] Foreign Application Priority Data

Nov. 15, 1977 [JP] Japan .................... 52-137492

[51] Int. Cl.$^2$ ............................................. H01B 3/12
[52] U.S. Cl. .................... 252/63.2; 106/73.3; 252/63.5; 361/321
[58] Field of Search ............... 252/63.2, 63.5; 106/73.3; 361/321

[56] References Cited

U.S. PATENT DOCUMENTS

| | | | |
|---|---|---|---|
| 3,468,680 | 9/1969 | Fujiwara ............................ | 106/73.3 |
| 3,869,398 | 3/1975 | Yamaoka et al. ................... | 252/63.5 |
| 3,951,873 | 4/1976 | Kikuchi et al. .................... | 252/63.5 X |
| 4,017,320 | 4/1977 | Fujiwara et al. ................... | 252/63.5 X |
| 4,058,404 | 11/1977 | Fujiwara et al. ................... | 252/63.5 X |

FOREIGN PATENT DOCUMENTS

| | | | |
|---|---|---|---|
| 70-30740 | 10/1970 | Japan ..................................... | 252/63.2 |
| 74-59298 | 6/1974 | Japan ..................................... | 252/63.5 |
| 75-95800 | 7/1975 | Japan ..................................... | 252/63.5 |

*Primary Examiner*—Harris A. Pitlick
*Attorney, Agent, or Firm*—Birch, Stewart, Kolasch & Birch

[57] ABSTRACT

A dielectric ceramic composition consists essentially of strontium titanate, magnesium titanate, bismuth oxide, titanium oxide, and lead oxide, these components being present in the following compositional proportion when expressed by the formulas, SrTiO$_3$, MgTiO$_3$, Bi$_2$O$_3$, TiO$_2$ and Pb$_3$O$_4$, respectively:

| | | |
|---|---|---|
| SrTiO$_3$ | 30.0–60.0 | wt % |
| MgTiO$_3$ | 2.0–32.0 | wt % |
| Bi$_2$O$_3$ | 10.0–34.0 | wt % |
| TiO$_2$ | 3.0–15.0 | wt % |
| Pb$_3$O$_4$ | 2.0–20.0 | wt % |
| Pb$_3$O$_4$/MgTiO$_3$ | 0.625–10.0 | (weight ratio) |

The composition exhibits high permittivity, small dielectric loss, small dependency of permittivity on temperature, and high dielectric breakdown voltage in combination, so that it makes it possible to produce physically small capacitors with large capacity and high rating voltage. The process for production of the composition is characterized by the use of MgTiO$_3$ and Pb$_3$O$_4$ as respective sources of magnesium and lead.

2 Claims, No Drawings

DIELECTRIC CERAMIC COMPOSITION AND PROCESS FOR ITS PRODUCTION CONTAINING MgTiO₃ AND Pb₃O₄ HAVING A QUANTITATIVE RELATIONSHIP

BACKGROUND OF THE INVENTION

The present invention relates to dielectric ceramic compositions which exhibit high permittivity, small dependency of permittivity on temperature, small dielectric loss and, high dielectric breakdown voltage and a process for its production.

Ceramic capacitors with large capacity having a high rating DC voltage of 500 V and above are conventionally made from dielectric ceramic compositions containing a large percentage of barium titanate. However, such ceramic materials have serious disadvantages in that they exhibit large dielectric loss and large dependency of permittivity on voltage, and causes noises due to the piezoelectricity and the generation of large distortion of wave forms. In order to overcome these disadvantages, it has been proposed to use strontium titanate-based dielectric ceramic compositions, such as those containing bismuth titanate and lead titanate as additives, or those containing bismuth titanate and magnesium oxide as additives. However, these strontium titanate-based dielectric ceramic compositions, although exhibiting either small dielectric loss, small temperature change rate of permittivity or large permittivity, do not exhibit all these properties in combination. For example, the former exhibits large permittivity, but has disadvantages that it has large dielectric loss and large temperature change rate of permittivity. The latter may exhibit small dielectric loss of about 0.02% and small temperature change rate of permittivity of ±0%, but has the disadvantage that it exhibits low permittivity of about 1000.

SUMMARY OF THE INVENTION

It is therefore a main object of the present invention to provide dielectric ceramic compositions exhibiting high permittivity, small dielectric loss, small change in permittivity with temperature and high dielectric breakdown voltage characteristic in combination.

Another object of the present invention is to provide a dielectric ceramic composition which makes it possible to produce physically small ceramic capacitors with large capacity and high rating voltage of 1000 V and above.

Still another object of the present invention is to provide a process for producing dielectric ceramic compositions which makes it possible to produce physically small ceramic capacitors with large capacity a high rating voltage of 1000 V and above.

According to the present invention, there is provided a dielectric ceramic composition consisting essentially of strontium titanate, magnesium titanate, bismuth oxide, titanium oxide and lead oxide, these components being present in the following compositional proportions when expressed by the formulas $SrTiO_3$, $MgTiO_3$, $Bi_2O_3$, $TiO_2$ and $Pb_3O_4$:

The percentage and weight ratio of the components have been limited as being within the above respective ranges for the following reasons. If $SrTiO_3$ is less than 30.0 wt%, the permittivity becomes less than 1000 and the dielectric loss becomes great. Further, if $SrTiO_3$ is more than 60.0 wt%, the change rate of permittivity goes up to over −20%, which is the maximum allowable change rate of the permittivity, and the permittivity becomes less than 1500. If $MgTiO_3$ is less than 2.0 wt%, the permittivity becomes low and the change rate of permittivity goes up to over −20%. If $MgTiO_3$ is more than 32.0 wt%, it causes considerable decrease of the permittivity. If $Bi_2O_3$ is less than 10 wt% or more than 34.0 wt%, it causes the increase of dielectiric loss. If $TiO_2$ is less than 3.0 wt%, the dielectric loss becomes great, and if more than 15 wt%, the change rate of permittivity becomes more than −20%. If $Pb_3O_4$ is less than 2.0 wt%, the permittivity becomes low and, if more than 20.0 wt%, the dielectric loss goes up to over 1%. If the weight ratio of $Pb_3O_4$ to $MgTiO_3$ is less than 0.625 or more than 10.0, the permittivity does not go up to 1500. Finally, when lead oxide is expressed by the formula: PbO, lead oxide should be present in the amount from 1.95 to 19.53 wt% and, the weight ratio of PbO to $MgTiO_3$ is from 0.61 to 9.76.

The dielectric ceramic compositions of the present invention may be produced in the known manner, for example, by techniques conventionally employed for the production of dielectric ceramics. However, a preferred method, hereinafter described, consists in the use of magnesium titanate and trilead tetroxide or lead (II) oxide as respective sources of magnesium and lead. The use of these sources contributes to improvement in the dielectric breakdown voltage characteristic of the dielectric ceramics.

The dielectric ceramic compositions of the present invention exhibit high permittivity, small dielectric loss, high dielectric breakdown voltage characteristic, and small dependency of permittivity on temperature in combination. Thus, the compositions of the present invention make it possible to produce physically small ceramic capacitors with large capacity and high voltage rating. The noises due to piezoelectricity and distortion of wave form are considerably lowered, compared with those of the conventional ceramic capacitors.

Other objects and further scope of applicability of the present invention will become apparent from the detailed description given above and hereinafter with reference to the examples. It should be understood, however, that the detailed description and specific examples, while indicating preferred embodiments of the invention are given by way of illustration only, since various changes and modifications within the spirit and scope of the invention will become apparent to those skilled in the art from this detailed description.

DETAILED DESCRIPTION OF THE INVENTION

Example 1

Using powder of highly purified oxides or carbonates (purity: not less than 98%), viz, $TiO_2$, SrO and MgO (or $MgCO_3$) as raw materials, strontium titanate and magnesium titanate are prepared in the known manner. The resultant powder of strontium titanate ($SrTiO_3$) and magnesium titanate ($MgTiO_3$) are used for starting materials for the preparation of dielectric ceramics together with bismuth oxide ($Bi_2O_3$), titanium oxide ($TiO_2$) and trilead tetroxide ($Pb_3O_4$). Lead (II) oxide (PbO) may be employed as starting materials for trilead tetroxide. These materials are weighed and mixed to prepare mixture for the production of dielectric ceramic compositions each having the compositional proportion shown in Table 1. Each mixture is milled by the wet process for 10 hours together with 3 weight percent of a polyvinyl acetate-based organic binder in a pot milled of polyvinyl chloride, containing alumina procelain balls. The thus prepared slurry is dehydrated, dried, and passed through a 50 mesh sieve to obtain minus shieve. The resultant powder is shaped into disks having bulk density of 3.3 to 3.5, a diameter of 15 mm and a thickness of 3.6 mm by an oil press, placed in an alumina saggar covered at its bottom with zirconium oxide powder, and then fired in air at 1180° to 1280° C. for 2 hours to obtain dielectric ceramic compositions. Firing may be carried out at a temperature of the above range for 1 to 4 hours in an oxidizing temperature such as air or an atmosphere containing oxygen.

The resultant sintered disks are provided with silver electrodes on its both faces to prepare ceramic capacitors for test specimens.

The specimens were subjected to measurement of the permittivity ($\epsilon$), dielectric loss (tan $\delta$), dielectric breakdown voltage (B.V.) and the temperature change rate of permittivity ($\Delta C/C_o$). The results obtained are shown in Table 1. In this table asterisks (*) show the specimens each having a composition outside of the scope of the present invention.

These characteristic were determined as follows: $\epsilon$ and tan $\delta$ were measured with an automatic capacitance bridge made by Yokogawa Hewlett-Packard Co. under a voltage of 1 V r.m.s. at a frequency of 1 KHz. The temperature change rate of permittivity were determined by the following equation:

$$\Delta C/C_o = \frac{C_1 - C_2}{C_o} \times 100\ (\%)$$

where
$C_1$ = permittivity at $-30°$ C.
$C_2$ = permittivity at $+85°$ C.
$C_o$ = permittivity at a reference temperature of $+25°$ C.

As can be seen from Table 1 the specimens having the composition within the scope of the present invention exhibit high permittivity of 1500 or above, small dielectric loss of 1.00% or less, and preferred temperature change rate of permittivity of +20% or less, as compared with those having the compositions outside of the scope of the present invention.

TABLE 1

| Sample | compositional proportions (wt %) | | | | | $Pb_3O_4/$ $MgTiO_3$ | $\epsilon$ | tan $\delta$ (%) | $\Delta c/c$ (%) | B.V. KV/mm |
| | $SrTiO_3$ | $MgTiO_3$ | $Bi_2O_3$ | $TiO_2$ | $Pb_3O_4$ | | | | | |
| --- | --- | --- | --- | --- | --- | --- | --- | --- | --- | --- |
| 1* | 64.5 | 4.0 | 16.1 | 5.4 | 10.0 | 2.5 | 1350 | 0.00 | −25 | 11.2 |
| 2 | 60.0 | 4.0 | 19.3 | 6.7 | 10.0 | 2.5 | 1680 | 0.00 | −18 | 13.6 |
| 3* | 60.0 | 0.0 | 29.8 | 10.2 | 0.0 | — | 1110 | 0.03 | −23 | 10.5 |
| 4* | 56.4 | 1.0 | 28.1 | 9.5 | 5.0 | 5.0 | 1194 | 0.20 | −14 | 7.2 |
| 5* | 57.0 | 5.0 | 28.3 | 9.7 | 0.0 | 0 | 1100 | 0.00 | −10 | 10.0 |
| 6 | 55.8 | 2.0 | 27.7 | 9.5 | 5.0 | 2.5 | 1505 | 0.07 | −13 | 14.5 |
| 7* | 54.0 | 0.0 | 26.9 | 9.1 | 10.0 | 10.0 | 1300 | 0.40 | −24 | 9.5 |
| 8 | 54.0 | 5.0 | 26.9 | 9.1 | 5.0 | 1.0 | 1507 | 0.00 | −11 | 16.0 |
| 9 | 52.8 | 2.0 | 26.2 | 9.0 | 10.0 | 5.0 | 1618 | 0.02 | −14 | 15.5 |
| 10* | 51.6 | 4.0 | 17.2 | 17.2 | 10.0 | 2.25 | 1280 | 0.00 | −26 | 17.0 |
| 11 | 51.6 | 4.0 | 20.6 | 13.8 | 10.0 | 2.25 | 1710 | 0.00 | −17 | 15.7 |
| 12 | 51.6 | 4.0 | 22.9 | 11.5 | 10.0 | 2.25 | 2304 | 0.00 | −14 | 16.5 |
| 13 | 51.6 | 4.0 | 25.6 | 8.8 | 10.0 | 2.25 | 2374 | 0.01 | −13 | 17.0 |
| 14 | 51.6 | 4.0 | 28.6 | 5.8 | 10.0 | 2.25 | 2256 | 0.01 | −12 | 17.0 |
| 15* | 51.6 | 4.0 | 32.4 | 2.0 | 10.0 | 2.25 | 1210 | 2.50 | −17 | 8.0 |
| 16* | 51.0 | 15.0 | 25.4 | 8.6 | 0.0 | 0 | 865 | 0.00 | −8.1 | 9.0 |
| 17 | 48.6 | 4.0 | 24.1 | 8.3 | 15.0 | 3.75 | 3181 | 0.19 | −15 | 12.0 |
| 18 | 48.0 | 10.0 | 23.9 | 8.1 | 10.0 | 1.0 | 1665 | 0.02 | −13 | 16.5 |
| 19 | 45.6 | 4.0 | 22.6 | 7.8 | 20.0 | 5.0 | 4108 | 0.26 | −17 | 13.0 |
| 20 | 45.0 | 10.0 | 22.4 | 7.6 | 15.0 | 1.5 | 2760 | 0.16 | −15 | 14.0 |
| 21 | 45.0 | 15.0 | 22.4 | 7.6 | 10.0 | 0.66 | 1500 | 0.15 | −14 | 16.5 |
| 22* | 45.0 | 20.0 | 22.4 | 7.6 | 5.0 | 0.25 | 955 | 0.00 | −11 | 9.5 |
| 23 | 43.0 | 4.0 | 32.3 | 10.7 | 10.0 | 2.25 | 1800 | 0.60 | −8 | 17.5 |
| 24 | 42.0 | 10.0 | 20.9 | 7.1 | 20.0 | 2.0 | 3840 | 0.99 | −20 | 14.0 |
| 25* | 42.0 | 30.0 | 20.9 | 7.1 | 0.0 | 0 | 525 | 0.00 | −8.5 | 8.0 |
| 26* | 39.0 | 10.0 | 19.4 | 6.6 | 25.0 | 2.5 | 5130 | 2.60 | −40 | 6.5 |
| 27 | 39.0 | 20.0 | 19.4 | 6.6 | 15.0 | 0.75 | 1516 | 0.30 | −14 | 15.0 |
| 28* | 38.7 | 4.0 | 35.4 | 11.9 | 10.0 | 2.25 | 1410 | 2.50 | −11 | 8.0 |
| 29 | 36.0 | 20.0 | 17.9 | 6.1 | 20.0 | 1.0 | 2720 | 0.89 | −18 | 13.0 |
| 30* | 36.0 | 30.0 | 17.9 | 6.1 | 10.0 | 0.33 | 910 | 0.20 | −12 | 9.0 |
| 31 | 30.0 | 30.0 | 14.9 | 5.1 | 20.0 | 0.66 | 1560 | 0.88 | −15 | 14.0 |
| 32* | 27.0 | 20.0 | 22.0 | 11.0 | 20.0 | 1.0 | 710 | 5.60 | −25 | 8.0 |
| 33* | 18.0 | 40.0 | 8.9 | 3.1 | 30.0 | 0.75 | 260 | 3.00 | +34 | 6.0 |

COMPARATIVE EXAMPLE 1

Using $SrTiO_3$, $Bi_2O_3$, $TiO_2$, MgO and $PbTiO_3$ as starting materials, there are prepared comparative specimens comprising conventional dielectric ceramic compositions of the system $SrTiO_3$-$Bi_2O_3$.$2TiO_2$-MgO, or the system $SrTiO_3$-$PbTiO_3$-$BiO_2O_3$.$3TiO_2$ in the same manner as disclosed in Example 1. The results of the measurement of various electrical properties are shown in Table 2 together with those of the specimens Nos. 8, 13, 17, 19 and 21 in Table 1.

TABLE 2

| Specimen | $\epsilon$ | tan $\delta$ (%) | $\Delta C/C$ (%) |
| --- | --- | --- | --- |
| $SrTiO_3$(55.4 wt %)—$Bi_2O_3$ . $2TiO_2$— (34.6 wt %)- MgO/10.0 wt %) %) | 1100 | 0.02 | −10 |
| $SrTiO_3$(50.4 wt 5)- $PbT_3$- (16.0 wt %)- $Bl_2O_3$.$3TiO_2$(33.6 wt %) | 2100 | 0.40 | −26 |
| Specimen No. 8 | 1507 | 0.00 | −11 |
| Specimen No. 12 | 2374 | 0.01 | −13 |
| Specimen No. 17 | 3181 | 0.19 | −15 |
| Specimen No. 19 | 4108 | 0.26 | −17 |
| Specimen No. 21 | 1500 | 0.15 | −14 |

From the above table, it will be seen that the permittivity of the specimens comprising the dielectric ceramic compositions of the present invention is about 1.4 to 3 times that of the comparative specimen comprising the dielectric ceramic composition of the system SrTiO$_3$-Bi$_2$O$_3$.2TiO$_2$-MgO. Accordingly, the compositions of the present invention make it possible to produce C., and is superior to the latter in the dielectric characteristics and dielectric breakdown voltage. Further, the use of manganese titanate and lead oxide contributes to the improvement of the dielectric breakdown voltage characteristics:

TABLE 3

| | Compositional proportion (wt %) | | | | | Firing temp. (°C.) | ε | tan δ (%) | Δc/c (%) | Breakdown voltage (KV/mm) |
| --- | --- | --- | --- | --- | --- | --- | --- | --- | --- | --- |
| | SrTiO$_3$ | Bi$_2$O$_3$ | TiO$_2$ | Form & amount of Mg | Form & Amount of Pb | | | | | |
| Specimen No. 13 | 51.6 | 25.6 | 8.8 | MgTiO$_3$ = 4.0 | Pb$_3$O$_4$ = 10.0 | 1210 | 2374 | 0.01 | −13.0 | 17.0 |
| Comparative specimen No. 1 | 53.2 | 26.6 | 8.8 | MgO = 1.3 | Pb$_3$O$_4$ = 10.0 | 1300 | 1650 | 0.28 | −14.0 | 11.3 |
| Comparative specimen No. 2 | 52.3 | 26.1 | 8.7 | MgCO$_3$ = 2.8 | Pb$_3$O$_4$ = 10.0 | 1320 | 1590 | 0.48 | −15.0 | 8.7 |
| Comparative specimen No. 3 | 49.7 | 24.8 | 8.3 | MgTiO$_3$ = 4.0 | PbTiO$_3$ = 13.2 | 1270 | 1850 | 0.19 | −13.0 | 10.5 |
| Comparative specimen No. 4 | 51.3 | 25.6 | 8.5 | MgO = 1.3 | PbTiO$_3$ = 13.2 | 1300 | 1870 | 0.55 | −17.0 | 8.2 | ceramic capacitors physically smaller than those made from the conventional compositions of the above system. Further, as compared with the comparative specimen comprising the composition of the system SrTiO$_3$-Bi$_2$O$_3$.3TiO$_2$, the specimen No. 13 of which the permittivity is about the same as that of the former, shows a value of the dielectric loss (tan δ) about 1/40 times as large, and also a value of the temperature change rate of permittivity about ½ times as large.

COMPARATIVE EXAMPLE 2

Using magnesium oxide (MgO) or magnesium carbonate (MgCO$_3$) as a magnesium source, and using lead titanate (PbTiO$_3$) as a lead source, comparative specimens each comprising a dielectric ceramic composition shown in Table 3 are prepared in the same manner as disclosed in Example 1 except that the disk has a thickness of 4.0 mm and that the specimen is dip coated with epoxy resin. The resultant specimens are then subjected to the measurement of electrical properties. The results of the measurement are shown in Table 3 together with those of the specimen No. 13 in Table 1. In this example, MgO and MgCO$_3$ were respectively added in terms of a mol fraction of MgTiO$_3$, and also PbTiO$_3$ was added in terms of a mol fraction of PbO$_{4/3}$.

As can be seen from the Table 3, the specimen No. 13 can be sintered at a firing temperature lower than that of the comparative specimens Nos. 1 to 4 by about 100°

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What I claim is:

1. A dielectric ceramic composition comsisting essentially of strontium titanate, magnesium titanate, bismuth oxide, titanium oxide and lead oxide, wherein respective components are present in the following compositional proportion when the components are expressed by SrTiO$_3$, MgTiO$_3$, Bi$_2$O$_3$, TiO$_2$ and Pb$_3$O$_4$, respectively:

2. A process for producing dielectric ceramic compositions with high permittivity, small dependency of permittivity on temperature, small dielectric loss and high dielectric breakdown voltage, in combination which comprises the steps of (a) mixing 30.0 to 60.0 wt% of strontium titanate, 2.0 to 3.0 wt% of magnesium titanate, 10.0 to 34.0 wt% of Bi$_2$O$_3$, 3.0 to 15.0 wt% of TiO$_2$, 2.0 to 20.0 wt% of Pb$_3$O$_4$, the weight ratio of Pb$_3$O$_4$ to MgTiO$_3$ being in the range of 0.625 to 10.0; and (b) firing the resulting mixture at a temperature in the range of 1180° to 1280° C. in an oxidizing atmosphere.

* * * * *